United States Patent
Hecker

(10) Patent No.: US 7,741,780 B2
(45) Date of Patent: Jun. 22, 2010

(54) CERAMIC DISCHARGE VESSEL HAVING A SEALING COMPOSITION

(75) Inventor: Arlene Hecker, Beverly, MA (US)

(73) Assignee: Osram Sylvania Inc., Danvers, MA (US)

( * ) Notice: Subject to any disclaimer, the term of this patent is extended or adjusted under 35 U.S.C. 154(b) by 463 days.

(21) Appl. No.: 11/678,788

(22) Filed: Feb. 26, 2007

(65) Prior Publication Data
US 2008/0203916 A1 Aug. 28, 2008

(51) Int. Cl.
*H01J 17/16* (2006.01)
(52) U.S. Cl. .................................................. 313/636
(58) Field of Classification Search ................ 313/625, 313/636, 634, 25
See application file for complete search history.

(56) References Cited

U.S. PATENT DOCUMENTS

| | | | |
|---|---|---|---|
| 3,281,309 A | 10/1966 | Ross | |
| 3,469,729 A | 9/1969 | Grekila et al. | |
| 3,588,573 A * | 6/1971 | Chen et al. ................... | 313/325 |
| 3,588,577 A | 6/1971 | McVey et al. | |
| 4,076,991 A | 2/1978 | Datta | |
| 4,501,799 A * | 2/1985 | Driessen et al. ............. | 428/446 |
| 5,001,396 A * | 3/1991 | Snellgrove et al. .......... | 313/625 |
| 5,099,174 A * | 3/1992 | Coxon et al. ................. | 313/623 |
| 5,424,609 A | 6/1995 | Geven et al. | |
| 5,426,343 A | 6/1995 | Rhodes et al. | |
| 5,747,402 A * | 5/1998 | Wei et al. ..................... | 501/152 |
| 6,012,303 A | 1/2000 | Axelson et al. | |
| 6,414,436 B1 | 7/2002 | Eastlund et al. | |
| 6,525,476 B1 | 2/2003 | Geijtenbeek et al. | |
| 6,620,272 B2 | 9/2003 | Zaslavsky et al. | |
| 6,873,108 B2 * | 3/2005 | Hecker et al. ................ | 313/624 |
| 2007/0071956 A1 * | 3/2007 | Zou ............................. | 428/220 |

OTHER PUBLICATIONS

Obtained the ACerS-NIST Phase Equilibria Diagrams, vol. XIII (2001), pp. 290-291 of Sigalov et al.*

* cited by examiner

*Primary Examiner*—Toan Ton
*Assistant Examiner*—Hana S Featherly
(74) *Attorney, Agent, or Firm*—Robert F. Clark

(57) ABSTRACT

A sealing composition for ceramic discharge vessels is described. The sealing composition contains about 20 to about 40 mole percent MgO, about 20 to about 45 mole percent $Y_2O_3$, and about 20 to about 60 mole percent $Al_2O_3$ and has a melting point of less than about 1800° C., and preferably from about 1700° C. to about 1800° C. The sealing composition may be used for making ceramic-to-ceramic or ceramic-to-metal seals in ceramic discharge vessels.

18 Claims, 2 Drawing Sheets

CERAMIC DISCHARGE VESSEL HAVING A SEALING COMPOSITION

BACKGROUND OF THE INVENTION

Metal halide and high-pressure sodium lamps are two examples of lamps which use a discharge vessel, also known as an arc tube, made of a ceramic material. The preferred ceramic material for these arc tubes has been polycrystalline alumina (PCA). The robustness of the ceramic material permits the use of more corrosive chemical fills and allows the discharge vessels to be operated at higher temperatures. A sealing composition, commonly referred to as a frit, is used to form a hermetic seal between the feedthrough sections of the electrodes and the ceramic body of the discharge vessel. The sealing composition may also be used to join together the ceramic pieces which form the discharge vessel. The sealing composition is designed to have a lower melting point than the ceramic components so that the seals may be formed without additional sintering/shrinkage of the ceramic vessel. The sealing composition must be resistant to attack by the chemical fill while simultaneously withstanding the high operating temperatures of the discharge vessel.

An example of the application of a sealing composition in a ceramic metal halide lamp is shown in FIG. 1. The metal halide lamp has a ceramic discharge vessel 1 which is illustrated in cross section. The discharge vessel 1 is a two-piece design which is made by joining two identically molded ceramic halves in their green state and then subjecting the green piece to a high temperature sintering. The method of making the discharge vessel typically leaves a cosmetic seam 5 in the center where the two halves were mated. A more detailed description of a method of making this type of ceramic discharge vessel is described in U.S. Pat. No. 6,620,272 which is incorporated herein by reference. The discharge vessel is usually composed of translucent polycrystalline alumina, although other ceramic materials may be used.

In this example, the discharge vessel has hemispherical end wells 17a, 17b and is commonly referred to as a bulgy shape. The bulgy shape is preferred because it provides a more uniform temperature distribution compared to right-cylinder shapes such as those described in U.S. Pat. Nos. 5,424,609 and 6,525,476. The bulgy-shaped vessel has an axially symmetric body 6 which encloses a discharge chamber 12. Two opposed capillary tubes 2 extend outwardly from the body 6 along a central axis. In this 2-piece design, the capillary tubes have been integrally molded with the body of the discharge vessel.

Electrode assemblies 14 are inserted into each capillary tube 2. One end of the electrode assemblies 14 protrudes out of an end of the capillary tube to provide an electrical connection. The tips of the electrode assemblies which extend into the discharge chamber are fitted with a tungsten coil 3 or other similar means for providing a point of attachment for the arc discharge. The electrode assemblies are sealed hermetically to the capillary tubes by sealing composition 9. During lamp operation, the electrode assemblies act to conduct an electric current from an external source of electric power to the interior of the discharge vessel in order to form an arc in the discharge chamber.

The discharge chamber 12 contains a buffer gas, e.g., 30 to 300 torr Xe or Ar, and a metal halide fill 8 which may be combined with a small amount of mercury. For example, a commercial 4200K lamp may contain mercury plus a mixture of NaI, $CaI_2$, $DyI_3$, $HoI_3$, $TmI_3$, and TlI. In general, iodide salts are more favored than fluorides because of their lower reactivity and are more favored than chlorides or bromides because they tend to be less stable at higher temperatures. However, even the iodide salts are corrosive with respect to some lamp materials especially at high temperatures. In particular, the conventional sealing composition 9 is a $Al_2O_3$—$SiO_2$—$Dy_2O_3$ frit. The purpose of the long capillary tubes 2 is to keep the seal region cooler and reduce the corrosive action of the metal halide salts on the $Al_2O_3$—$SiO_2$—$Dy_2O_3$ frit. The elongated capillaries however impose size limitations on the discharge lamp which in turn restrict the types of lamp configurations which may be used. Therefore, it would be advantageous to have a sealing composition which would be less affected by metal halide fills thereby permitting shortened capillaries to be used.

SUMMARY OF THE INVENTION

A sealing composition for ceramic discharge vessels has been developed. The sealing composition contains about 20 to about 40 mole percent MgO, about 20 to about 45 mole percent $Y_2O_3$, and about 20 to about 60 mole percent $Al_2O_3$ and has a melting point of less than about 1800° C., and preferably from about 1700° C. to about 1800° C. More preferably, the sealing composition comprises about 38 mole percent MgO, about 31 mole percent $Y_2O_3$, and about 31 mole percent $Al_2O_3$ and has a melting point of about 1740° C.

The sealing composition may be used for making ceramic-to-ceramic or ceramic-to-metal seals in ceramic discharge vessels. Preferably, the sealing composition may be used to join polycrystalline alumina, sapphire, and yttrium aluminum garnet components or hermetically seal them to metal components comprised of niobium, tungsten, molybdenum, and alloys thereof.

The sealing composition may be melted by a number of means including a tungsten-element furnace, RF heating, laser, and gas torch. The sealing composition may also be made in various forms to facilitate sealing, e.g., as a bisque-fired disk, paint-like slurry, or a vapor-deposited coating, and may further be applied to ceramic components that have a variety of geometries. The resulting seal is expected to be more chemically and thermally resistant because it preferably does not contain silica and therefore should be able withstand higher temperatures than conventional silica-based frits. Moreover, each component of the sealing composition, yttria, alumina, and magnesia, are themselves components of PCA discharge vessels which are known to be chemically and thermally resistant in metal halide lamps.

Thus, discharge vessels using the sealing composition of this invention may be formed in a wider range of sizes, complexity, and/or functionality compared to current state-of-the-art ceramic discharge vessels, e.g., more compact and/or longer-life lamps. In addition, the sealing composition should be less expensive than the rare-earth-containing $Al_2O_3$—$SiO_2$—$Dy_2O_3$ frit.

DETAILED DESCRIPTION OF THE INVENTION

For a better understanding of the present invention, together with other and further objects, advantages and capabilities thereof, reference is made to the following disclosure and appended claims taken in conjunction with the above-described drawings.

Figure 1:
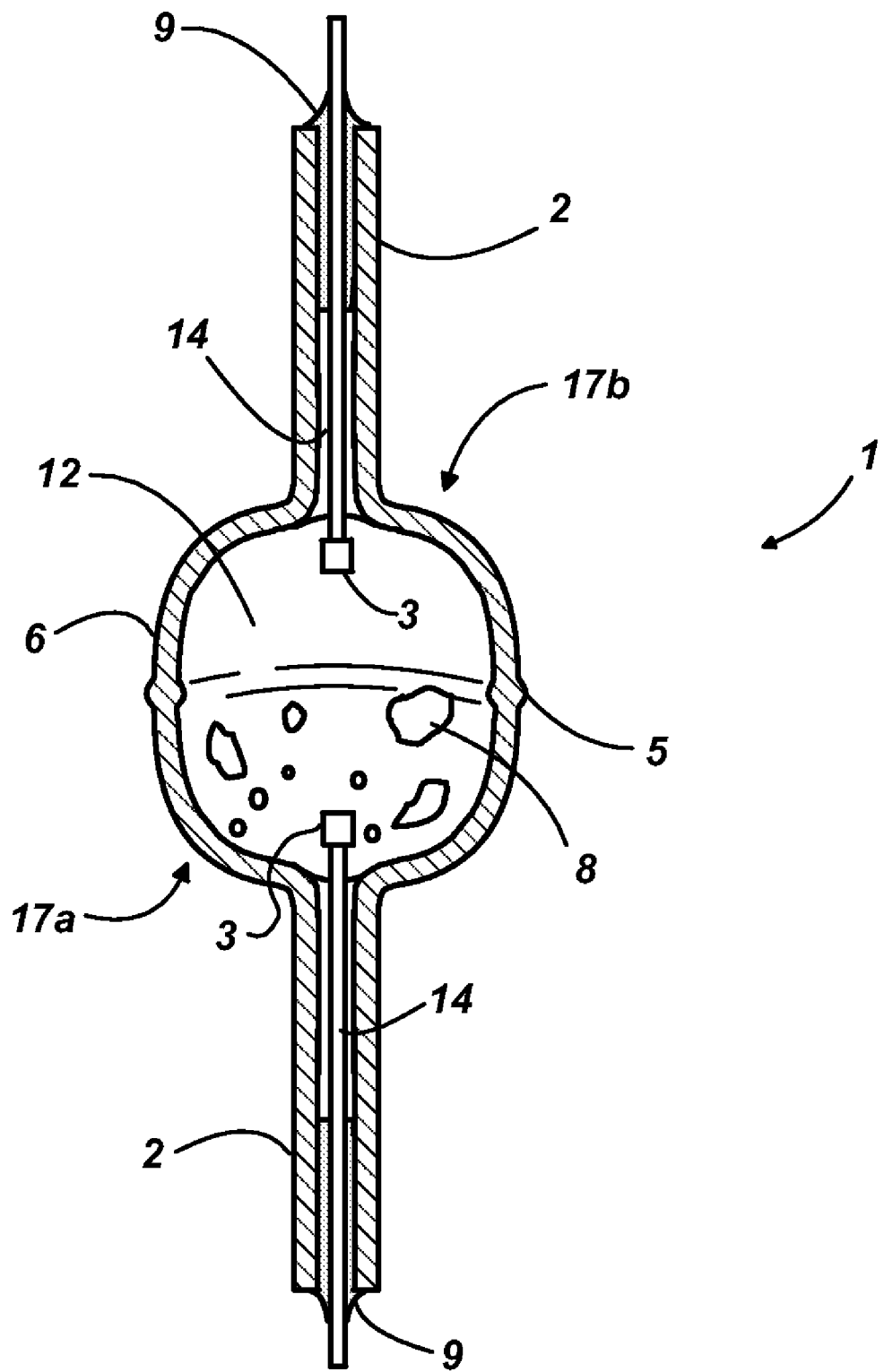
FIG. 1 is a cross-sectional illustration of the discharge vessel of a ceramic metal halide lamp.
Figure 2:
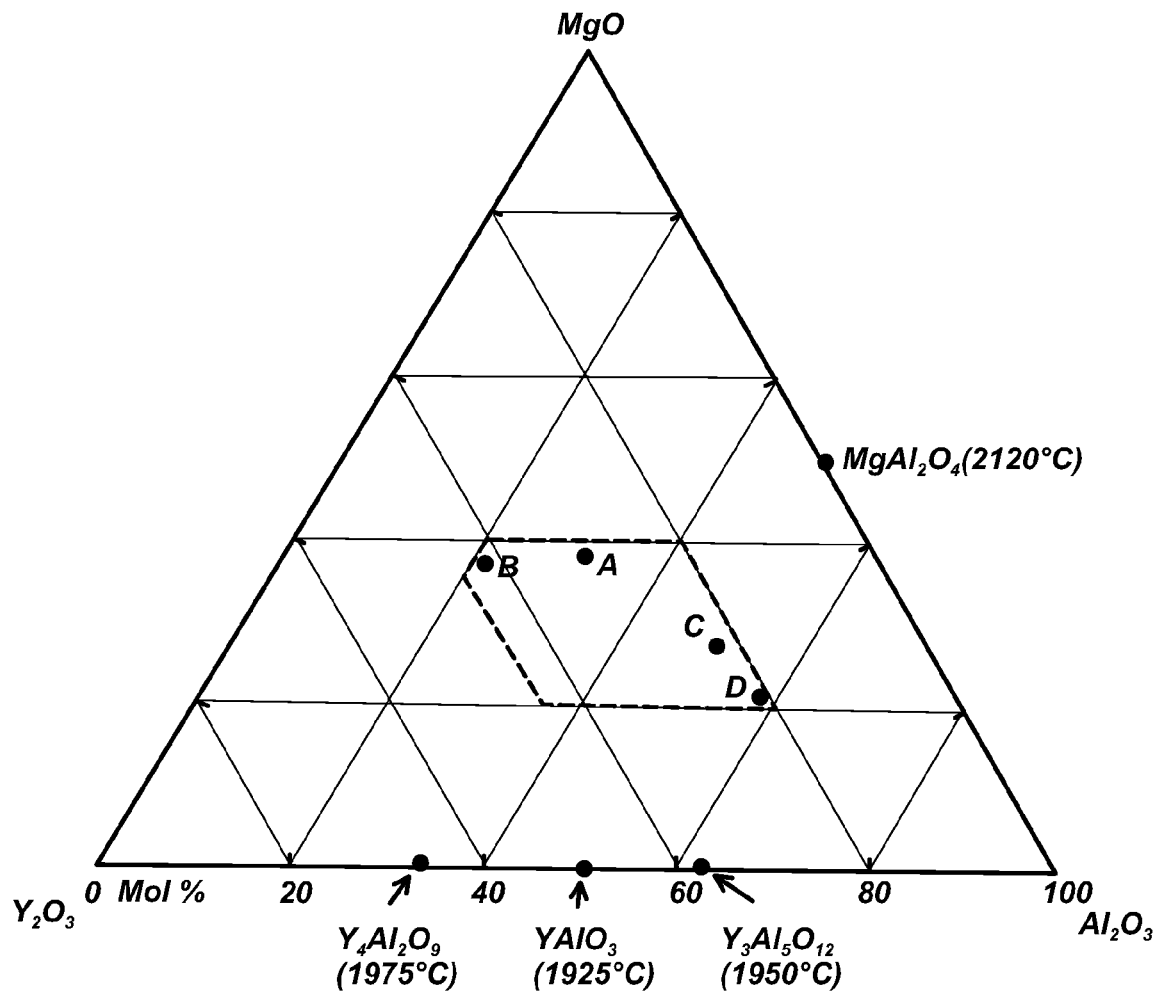
FIG. 2 is a ternary phase diagram for the MgO—$Al_2O_3$—$Y_2O_3$ system.

FIG. 2 is a ternary phase diagram for the MgO—$Al_2O_3$—$Y_2O_3$ system. Of particular interest are the quasibinary eutectic compositions which have melting points less than about 1800° C. The compositions of the quasibinary eutectics are shown as points A-D in FIG. 2 and are listed below in Table 1. Compositions are given in mole percent (mol %).

TABLE 1

Quasibinary Eutectic Compositions

| Eutectic Composition | Temperature (° C.) | Composition (mol %) | | |
|---|---|---|---|---|
| | | MgO | $Y_2O_3$ | $Al_2O_3$ |
| A | 1740 | 38 | 31 | 31 |
| B | 1790 | 37 | 42 | 21 |
| C | 1760 | 27.5 | 22.5 | 50 |
| D | 1775 | 21 | 21 | 58 |

The quasibinary eutectic compositions are contained within a region defined by the dashed line in FIG. 2. This compositional region is defined as about 20 to about 40 mole percent MgO, about 20 to about 45 mole percent $Y_2O_3$, and about 20 to about 60 mole percent $Al_2O_3$. The lower melting points of the quasibinary eutectics make it easier to form consistently crack-free seals and therefore makes them more desirable than the $Y_2O_3$—$Al_2O_3$ binary eutectics which have melting points above 1820° C. Although silica is generally to be avoided because of its reactivity with respect to the metal halide fill, a small amount, less than about 5 weight percent, might be added to enhance thermal shock resistance and adjust the thermal expansion coefficient of the sealing composition. This amount of silica is much less than the 25 wt. % used in the conventional $Al_2O_3$—$SiO_2$—$Dy_2O_3$ sealing composition.

Example

A sealing composition corresponding to quasibinary eutectic A was made by combining, in percent by weight, yttrium oxide (59.9%), aluminum oxide (27.0%), and magnesium oxide (13.1%) powders. The oxide mixture was mixed by ball milling in a plastic jar with de-ionized water and high-purity alumina media. After mixing, the oxide mixture was dried and fired in air at 900° C. to partially sinter the oxide particles together so that the mixture would remain homogeneous during the remaining processing steps. The fired mixture was then mixed with a polyvinyl alcohol binder and pressed into small rings suitable for sealing ceramic metal halide lamps. The sealing rings were partially sintered in air at 1250° C. prior to sealing tests.

Sealing/joining tests were performed using three different types of heating equipment: a tungsten-coil furnace, RF heating, and laser heating. Crack-free seals were made on 70 W discharge vessels having multi-strand electrode feedthroughs. Tungsten coil sealing equipment was used to locally heat the seal region to >1740° C. and melt the sealing ring, while staying below the PCA melting temperature (2050° C.).

While there have been shown and described what are presently considered to be the preferred embodiments of the invention, it will be apparent to those skilled in the art that various changes and modifications can be made herein without departing from the scope of the invention as defined by the appended claims.

I claim:

1. A ceramic discharge vessel, comprising: a ceramic body, at least one electrode assembly, and at least one seal, the ceramic body enclosing a discharge chamber, the seal containing a sealing composition having a melting point of less than about 1800° C. and consisting of about 20 to about 40 mole percent MgO, about 20 to about 45 mole percent $Y_2O_3$, about 20 to about 60 mole percent $Al_2O_3$ and less than about 5 weight percent silica.

2. The ceramic discharge vessel of claim 1 wherein the melting point of the sealing composition is greater than about 1700° C. and less than about 1800° C.

3. The ceramic discharge vessel of claim 1 wherein the sealing composition comprises about 38 mole percent MgO, about 31 mole percent about $Y_2O_3$, and about 31 mole percent $Al_2O_3$ and has a melting point of about 1740° C.

4. The ceramic discharge vessel of claim 1 wherein the ceramic body is comprised of polycrystalline alumina and the discharge chamber contains a metal halide fill.

5. The ceramic discharge vessel of claim 4 wherein the sealing composition comprises about 38 mole percent MgO, about 31 mole percent about $Y_2O_3$, and about 31 mole percent $Al_2O_3$ and has a melting point at about 1740° C.

6. The ceramic discharge vessel of claim 1 wherein the sealing composition joins at least two ceramic parts of the discharge vessel.

7. The ceramic discharge vessel of claim 1 wherein the discharge vessel has at least one capillary tube extending outwardly from the ceramic body and the at least one seal is between the at least one capillary tube and a portion of the at least one electrode assembly.

8. The ceramic discharge vessel of claim 7 wherein the capillary tube is comprised of polycrystalline alumina and the portion of the electrode assembly is comprised of molybdenum or niobium.

9. The ceramic discharge vessel of claim 8 wherein the sealing composition comprises about 38 mole percent MgO, about 31 mole percent about $Y_2O_3$, and about 31 mole percent $Al_2O_3$ and has a melting point at about 1740° C.

10. The ceramic discharge vessel of claim 1 wherein the sealing composition is selected from the group consisting of eutectic compositions A, B, C, and D, wherein:

| Eutectic Composition | Composition (mol %) | | |
|---|---|---|---|
| | MgO | $Y_2O_3$ | $Al_2O_3$ |
| A | 38 | 31 | 31 |
| B | 37 | 42 | 21 |
| C | 27.5 | 22.5 | 50 |
| D | 21 | 21 | 58. |

11. The ceramic discharge vessel of claim 1 wherein the sealing composition has a melting point in a range from 1740° C. to 1790° C.

12. The ceramic discharge vessel of claim 1 wherein the sealing composition joins two polycrystalline alumina parts of the discharge vessel.

13. The ceramic discharge vessel of claim 1 wherein the sealing composition joins a polycrystalline alumina part of the discharge vessel to a sapphire part of the discharge vessel.

14. A sealed ceramic article, comprising a first part comprised of a first ceramic material and a second part comprised of either a second ceramic material or a metal, a sealing composition joining the first and second parts to form the seal, the sealing composition having a melting point of less than about 1800° C. and consisting of about 20 to about 40 mole percent MgO, about 20 to about 45 mole percent $Y_2O_3$, about 20 to about 60 mole percent $Al_2O_3$ and less than about 5 weight percent silica.

15. The sealed ceramic article of claim 14 wherein the melting point of the sealing composition is greater than about 1700° C. and less than about 1800° C.

16. The sealed ceramic article of claim 14 wherein the sealing composition comprises about 38 mole percent MgO, about 31 mole percent about $Y_2O_3$, and about 31 mole percent $Al_2O_3$ and has a melting point of about 1740° C.

17. The sealed ceramic article of claim 14 wherein the first and second ceramic materials are polycrystalline alumina.

18. The sealed ceramic article of claim 14 wherein the sealing composition has a melting point in a range from 1740° C. to 1790° C.

\* \* \* \* \*